United States Patent
Takeuchi et al.

(10) Patent No.: US 12,110,985 B2
(45) Date of Patent: Oct. 8, 2024

(54) SWITCHING VALVE, ELECTRO-HYDROSTATIC CIRCUIT, AND AIRCRAFT

(71) Applicants: MITSUBISHI HEAVY INDUSTRIES, LTD., Tokyo (JP); NABTESCO CORPORATION, Tokyo (JP)

(72) Inventors: Motoyasu Takeuchi, Tokyo (JP); Toshinori Abe, Tokyo (JP); Kazuyuki Suzuki, Tokyo (JP); Hideki Niwa, Tokyo (JP)

(73) Assignees: MITSUBISHI HEAVY INDUSTRIES, LTD., Tokyo (JP); NABTESCO CORPORATION, Tokyo (JP)

( * ) Notice: Subject to any disclaimer, the term of this patent is extended or adjusted under 35 U.S.C. 154(b) by 180 days.

(21) Appl. No.: 17/794,833

(22) PCT Filed: Dec. 17, 2020

(86) PCT No.: PCT/JP2020/047103
§ 371 (c)(1),
(2) Date: Jul. 22, 2022

(87) PCT Pub. No.: WO2021/149416
PCT Pub. Date: Jul. 29, 2021

(65) Prior Publication Data
US 2023/0086713 A1    Mar. 23, 2023

(30) Foreign Application Priority Data
Jan. 23, 2020   (JP) ................ 2020-009472

(51) Int. Cl.
*F16K 11/07* (2006.01)
*B64C 13/50* (2006.01)
*F16K 31/42* (2006.01)

(52) U.S. Cl.
CPC .......... *F16K 31/426* (2013.01); *B64C 13/504* (2018.01); *F16K 11/0712* (2013.01)

(58) Field of Classification Search
CPC ............... F16K 31/426; F16K 31/1221; F16K 31/1226; F16K 11/0716; B64C 13/504; F15B 13/0402
See application file for complete search history.

(56) References Cited

U.S. PATENT DOCUMENTS

| | | | |
|---|---|---|---|
| 3,628,424 A | 12/1971 | Fruehanf | |
| 2018/0306212 A1* | 10/2018 | Weickel | F15B 13/0821 |
| 2021/0089061 A1* | 3/2021 | Bill | G05D 16/101 |

FOREIGN PATENT DOCUMENTS

| | | |
|---|---|---|
| DE | 10 2015 221 940 | 10/2016 |
| JP | 2004-100727 | 4/2004 |
| JP | 2007-46790 | 2/2007 |

OTHER PUBLICATIONS

Extended European Search Report issued May 10, 2023 in corresponding European Patent Application No. 20915467.3.

* cited by examiner

*Primary Examiner* — Kelsey E Cary
(74) *Attorney, Agent, or Firm* — Wenderoth, Lind & Ponack, L.L.P.

(57) ABSTRACT

A switching valve includes a sleeve on which a plurality of ports are disposed; a spool that is disposed inside the sleeve to move in an axial direction by a pilot hydraulic pressure to switch between switching lines each serving as a flow channel for hydraulic fluid that is formed by a combination of the ports; a first energizing unit that energizes the spool against the pilot hydraulic pressure; a relief hole that is disposed on the spool to discharge the hydraulic fluid with the pilot hydraulic pressure; a valve body that closes the relief hole; and a second energizing unit that energizes the (Continued)

valve body toward the relief hole of the spool against the pilot hydraulic pressure, and when the pilot hydraulic pressure exceeds a predetermined value, opens the relief hole.

8 Claims, 1 Drawing Sheet

SWITCHING VALVE, ELECTRO-HYDROSTATIC CIRCUIT, AND AIRCRAFT

FIELD

The present invention relates to a switching valve, an electro-hydrostatic circuit, and an aircraft.

BACKGROUND

Regarding an electro-hydrostatic circuit of an electro-hydrostatic actuator mounted on a control surface of an aircraft, there is known a switching valve configured to switch a line for hydraulic fluid corresponding to an operation mode of the actuator such as a normal mode, a bypass mode, and a damping mode depending on a situation.

In a case of switching the line of the switching valve using a pilot hydraulic pressure in the electro-hydrostatic circuit, a pilot hydraulic line is configured to suppress backflow and leakage of hydraulic fluid so as to stably switch the line. Due to this, overpressurization may be caused in the pilot hydraulic line due to thermal expansion and the like. In a case in which overpressurization is caused in the pilot hydraulic line, an overload is applied to the switching valve, so that the pilot hydraulic pressure in the pilot hydraulic line needs to be released. At this point, if a relief valve for releasing the pilot hydraulic pressure is additionally disposed separately from the switching valve, weight increase is caused.

The present invention is made in view of such a situation, and provides a lightweight switching valve, electro-hydrostatic circuit, and aircraft that can suppress an overload.

SUMMARY OF THE INVENTION

A switching valve according to the present invention includes: a sleeve on which a plurality of ports are disposed; a spool that is disposed inside the sleeve to move in an axial direction by a pilot hydraulic pressure to switch between switching lines each serving as a flow channel for hydraulic fluid that is formed by a combination of the ports; a first energizing unit that energizes the spool against the pilot hydraulic pressure; a relief hole that is disposed on the spool to discharge the hydraulic fluid with the pilot hydraulic pressure; a valve body that closes the relief hole; and a second energizing unit that energizes the valve body toward the relief hole of the spool against the pilot hydraulic pressure, and when the pilot hydraulic pressure exceeds a predetermined value, opens the relief hole.

With this configuration, overpressurization of the pilot hydraulic pressure can be suppressed by the relief hole and the valve body. Additionally, the relief hole for discharging the pilot hydraulic pressure, the valve body, and the second energizing unit are disposed on the spool, so that the weight can be reduced as compared with a configuration of adding a line that branches off from the pilot hydraulic line and includes a relief valve disposed therein.

Further, it is preferable that moving directions of the valve body and the second energizing unit are the same as the axial direction.

With this configuration, energizing force of the second energizing unit can efficiently act against the pilot hydraulic pressure, so that the energizing force of the second energizing unit can be reduced.

Further, it is preferable that the second energizing unit is a compression spring.

With this configuration, configurations of the valve body and the second energizing unit can be further simplified.

Further, it is preferable that the valve body metal-touches the relief hole of the spool.

With this configuration, the relief hole can be more preferably closed by the valve body, and it is possible to prevent the hydraulic fluid from leaking out in a case in which the pilot hydraulic pressure is equal to or smaller than the predetermined value.

Further, it is preferable that the switching valve includes a sealing material that is disposed between the sleeve and the spool to seal the switching line against a pilot hydraulic line for supplying the hydraulic fluid with the pilot hydraulic pressure.

With this configuration, the sleeve and the spool can be more preferably sealed, and the pilot hydraulic pressure can be prevented from leaking out.

Further, an electro-hydrostatic circuit according to the present invention includes: a supply line that connects between a hydraulic supply device that supplies hydraulic fluid and a driving part to be driven by a hydraulic pressure of the hydraulic fluid supplied from the hydraulic supply device; the above-described switching valve that is disposed in the supply line to switch between the plurality of switching lines for the hydraulic fluid that is supplied to the driving part by the pilot hydraulic pressure; a pilot hydraulic line that is connected to the switching valve to supply the hydraulic fluid with the pilot hydraulic pressure; a check valve that is disposed in the pilot hydraulic line; a solenoid valve that is disposed in the pilot hydraulic line on a downstream side of the check valve in a circulating direction of the hydraulic fluid to change a supply state of the hydraulic fluid to the switching valve; and a sealing material that is disposed in the switching valve to seal the hydraulic fluid with the pilot hydraulic pressure.

Further, an aircraft includes: a control surface; and an actuator serving as the driving part that actuates the control surface by using the above-described electro-hydrostatic circuit.

With these configurations, by preventing the pilot hydraulic pressure from leaking out with the check valve and the sealing material, the switching line can be prevented from being unexpectedly switched due to pressure drop in the supply line. Furthermore, by suppressing overpressurization of the pilot hydraulic pressure with the relief hole and the valve body, the electro-hydrostatic circuit can be prevented from being damaged. Additionally, the relief hole for discharging the pilot hydraulic pressure, the valve body, and the second energizing unit are disposed on the spool, so that the weight can be reduced as compared with a configuration of adding a line that branches off from the pilot hydraulic line and includes a relief valve disposed therein. The pilot hydraulic pressure is used for switching the switching valve, and supply of the pilot hydraulic pressure is controlled by the solenoid valve, so that the solenoid valve can be downsized as compared with a case of directly using the solenoid valve for switching the switching valve. Accordingly, the weight of the entire electro-hydrostatic circuit can be reduced, and power consumption can be suppressed.

DESCRIPTION OF EMBODIMENTS

Figure 1:
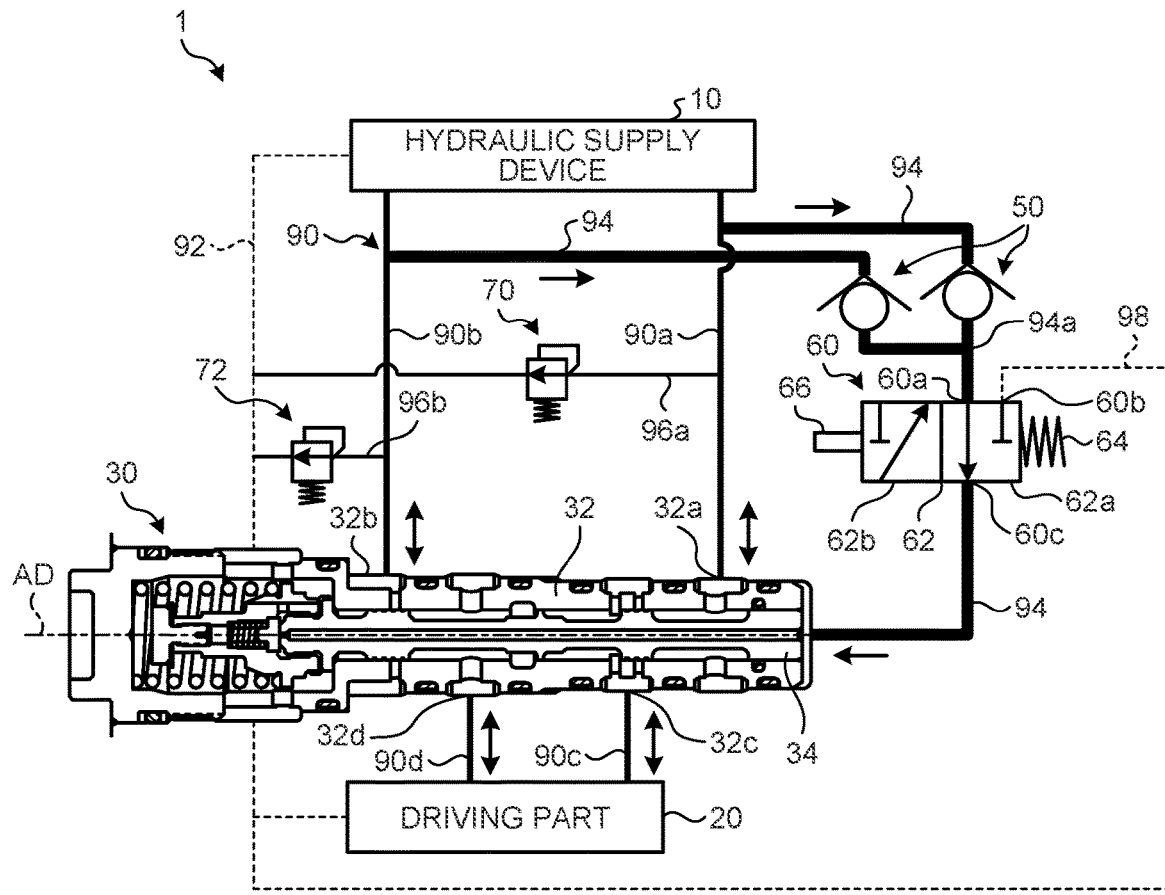
FIG. 1 is a diagram illustrating an electro-hydrostatic circuit according to an embodiment.

The following describes an embodiment of a switching valve and an electro-hydrostatic circuit according to the present invention in detail based on the drawings. The present invention is not limited to the embodiment. Constituent elements in the following embodiment include a constituent element that can be easily replaced by those skilled in the art, or substantially the same constituent element. Furthermore, the constituent elements described below can be appropriately combined with each other. In the following description about the embodiment, the same configuration is denoted by the same reference numeral, and a different configuration is denoted by a different reference numeral.

First, the following describes a configuration of an electro-hydrostatic circuit 1 according to the embodiment with reference to FIG. 1. FIG. 1 is a schematic diagram illustrating the electro-hydrostatic circuit according to the embodiment. The electro-hydrostatic circuit 1 drives a driving part 20 by a hydraulic pressure of hydraulic fluid supplied from a hydraulic supply device 10. The hydraulic supply device 10 is connected to the driving part 20 by a supply line 90 and an auxiliary supply line 92 via a switching valve 30. The supply line 90 includes a first supply line 90a, a second supply line 90b, a third supply line 90c, and a fourth supply line 90d.

The first supply line 90a connects the hydraulic supply device 10 to the switching valve 30. The first supply line 90a branches off to a pilot hydraulic line 94. The first supply line 90a further branches off to a first relief line 96a. The first relief line 96a is connected to the auxiliary supply line 92 via a first relief valve 70. The first relief valve 70 is opened in a case in which a hydraulic pressure of the first supply line 90a exceeds a predetermined value to discharge the hydraulic fluid to the auxiliary supply line 92.

The second supply line 90b connects the hydraulic supply device 10 to the switching valve 30. The second supply line 90b branches off to the pilot hydraulic line 94. The second supply line 90b further branches off to a second relief line 96b. The second relief line 96b is connected to the auxiliary supply line 92 via a second relief valve 72. The second relief valve 72 is opened in a case in which the hydraulic pressure of the second supply line 90b exceeds a predetermined value to discharge the hydraulic fluid to the auxiliary supply line 92.

The third supply line 90c connects the switching valve 30 to the driving part 20. The fourth supply line 90d connects the switching valve 30 to the driving part 20.

The auxiliary supply line 92 passes through an internal space 36a of the switching valve 30 in which a first energizing unit 36 (refer to FIG. 2) (described later) is disposed. The auxiliary supply line 92 may be connected to the third supply line 90c and the fourth supply line 90d. In this case, circulation of the hydraulic fluid from the auxiliary supply line 92 to the third supply line 90c and the fourth supply line 90d is allowed. Additionally, circulation of the hydraulic fluid from the third supply line 90c and the fourth supply line 90d to the auxiliary supply line 92 is blocked.

The pilot hydraulic line 94 is connected to the switching valve 30 via a check valve 50 and a solenoid valve 60. In the embodiment, pilot hydraulic lines 94 respectively branch off from the first supply line 90a and the second supply line 90b, and merge with each other at a merging part 94a to be connected to the switching valve 30.

The hydraulic supply device 10 supplies hydraulic fluid to the first supply line 90a, the second supply line 90b, and the auxiliary supply line 92. The hydraulic supply device 10 includes, for example, an electric motor, and a variable-displacement hydraulic pump that can discharge hydraulic fluid to two paths (the first supply line 90a and the second supply line 90b) in accordance with rotation of the electric motor. The hydraulic supply device 10 further includes, for example, an accumulator that supplies hydraulic fluid to the supply line 90 via the auxiliary supply line 92 in a case in which a flow rate of hydraulic fluid circulating in the supply line 90 is insufficient.

The driving part 20 is driven when the hydraulic fluid is supplied thereto from the third supply line 90c and the fourth supply line 90d. As the driving part 20, for example, an actuator that actuates a control surface of an aircraft is applied. The actuator includes a cylinder, a piston disposed inside the cylinder, and a rod coupled to the piston. The actuator forms a first chamber connected to the third supply line 90c and a second chamber connected to the fourth supply line 90d by the cylinder and the piston. The rod is connected to the control surface. The control surface is configured to be able to be oscillated by the actuator.

The driving part 20 includes a plurality of operation modes. In the embodiment, the operation modes include a normal mode and a damping mode. In the normal mode, the driving part 20 is driven when the hydraulic fluid is supplied thereto from the hydraulic supply device 10 via the supply line 90. In the damping mode, supply of the hydraulic fluid to the driving part 20 from the hydraulic supply device 10 via the supply line 90 is blocked. In this case, the hydraulic fluid is supplied to the third supply line 90c and the fourth supply line 90d via the auxiliary supply line 92. That is, in the actuator in the damping mode, the first chamber communicates with the second chamber via the third supply line 90c, the switching valve 30, and the fourth supply line 90d. In this case, the hydraulic fluid moves between the first chamber and the second chamber due to external force such as an air load of the control surface, and the hydraulic fluid is supplied to the third supply line 90c and the fourth supply line 90d via the auxiliary supply line 92 as needed.

The switching valve 30 is disposed in the supply line 90. The switching valve 30 switches between a plurality of switching lines for the hydraulic fluid supplied to the driving part 20. The switching valve 30 switches between the switching lines by a pilot hydraulic pressure of the hydraulic fluid supplied from the pilot hydraulic line 94. In the embodiment, the switching lines of the switching valve 30 include a first switching line and a second switching line. The first switching line causes pieces of the supply line 90 connecting the hydraulic supply device 10 to the driving part 20 to communicate each other. That is, the first switching line causes the first supply line 90a to communicate with the third supply line 90c. The first switching line causes the second supply line 90b to communicate with the fourth supply line 90d. The second switching line blocks between the first supply line 90a and the third supply line 90c. The second switching line blocks between the second supply line 90b and the fourth supply line 90d. The second switching line causes the third supply line 90c to communicate with the fourth supply line 90d via a restrictor element 30b (refer to FIG. 2) (described later).

The check valve 50 is disposed in the pilot hydraulic line 94. In the embodiment, the check valve 50 is disposed between the first supply line 90a and the merging part 94a.

The check valve 50 allows the hydraulic fluid to circulate from the first supply line 90a to the solenoid valve 60. The check valve 50 blocks circulation of the hydraulic fluid from the solenoid valve 60 to the first supply line 90a. In the embodiment, the check valve 50 is disposed between the second supply line 90b and the merging part 94a. The check valve 50 allows the hydraulic fluid to circulate from the second supply line 90b to the solenoid valve 60. The check valve 50 blocks circulation of the hydraulic fluid from the solenoid valve 60 to the second supply line 90b.

The solenoid valve 60 is disposed in the pilot hydraulic line 94 on a downstream side of the two check valves 50 in a circulating direction of the hydraulic fluid with a pilot hydraulic pressure. The solenoid valve 60 changes a supply state of the hydraulic fluid to the switching valve 30. The solenoid valve 60 includes a valve body 62, an energizing unit 64, and an electromagnetic driving part 66.

The valve body 62 selectively connects any one of a supply port 60a and a discharge port 60b to a port 60c on the switching valve side. The supply port 60a communicates with the check valve 50 via the pilot hydraulic line 94. The discharge port 60b communicates with a discharge line 98. The discharge line 98 communicates with the auxiliary supply line 92 and the like. The port 60c on the switching valve side communicates with the switching valve 30 via the pilot hydraulic line 94.

The valve body 62 moves between a supply position 62a for connecting the supply port 60a to the port 60c on the switching valve side and a discharge position 62b for connecting the discharge port 60b to the port 60c on the switching valve side. The energizing unit 64 energizes the valve body 62 to the supply position 62a. In the embodiment, the energizing unit 64 is a compression spring. The electromagnetic driving part 66 is, for example, configured so that a current can be supplied thereto from an external control device. At the time when the current is applied, the electromagnetic driving part 66 moves the valve body 62 to the discharge position 62b against energizing force of the energizing unit 64. In a case in which the valve body 62 is positioned at the supply position 62a, the hydraulic fluid with the pilot hydraulic pressure is supplied to the switching valve 30. In a case in which the valve body 62 is positioned at the discharge position 62b, the hydraulic fluid can be discharged from the discharge port 60b.

Figure 2:
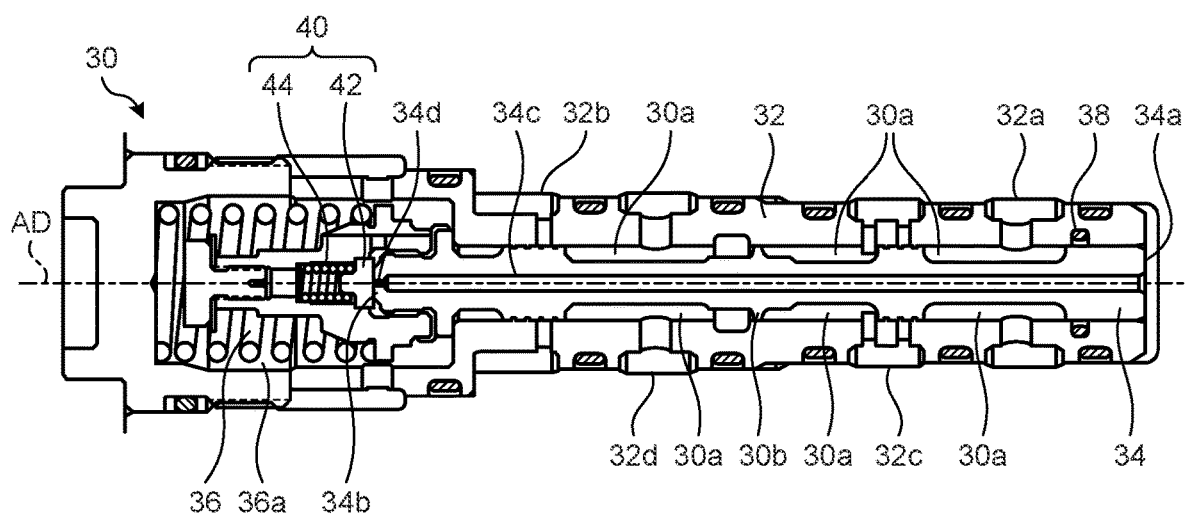
FIG. 2 is a diagram illustrating a switching valve according to the embodiment.

Next, the following describes a detailed configuration of the switching valve 30 with reference to FIG. 2. FIG. 2 is a schematic diagram illustrating the switching valve according to the embodiment. The switching valve 30 includes a sleeve 32, a spool 34, the first energizing unit 36, a sealing material 38, and a third relief valve 40.

The sleeve 32 has a cylindrical shape as an external shape of the switching valve 30. A plurality of ports are disposed on the sleeve 32. The sleeve 32 includes a first port 32a on a supply side, a second port 32b on the supply side, a first port 32c on the driving part side, and a second port 32d on the driving part side. The first port 32a on the supply side communicates with the hydraulic supply device 10 via the first supply line 90a. The second port 32b on the supply side communicates with the hydraulic supply device 10 via the second supply line 90b. The first port 32c on the driving part side communicates with the driving part 20 via the third supply line 90c. The second port 32d on the driving part side communicates with the driving part 20 via the fourth supply line 90d. A flow channel 30a for the hydraulic fluid is formed by connecting the ports to each other. The flow channel 30a includes a plurality of switching lines.

The spool 34 has a rod shape including a plurality of recessed parts. The recessed part is the flow channel 30a for the hydraulic fluid in the switching valve 30. The spool 34 is disposed inside the sleeve 32. The spool 34 can move in an axial direction AD inside the sleeve 32. One end part 34a of the spool 34 communicates with the pilot hydraulic line 94. The spool 34 is energized toward another end part 34b by the pilot hydraulic pressure of the hydraulic fluid circulating in the pilot hydraulic line 94.

The first energizing unit 36 is disposed on the end part 34b side of the spool 34. The first energizing unit 36 is disposed in the internal space 36a of the switching valve 30. The auxiliary supply line 92 passes through the internal space 36a. The first energizing unit 36 energizes the spool 34 toward the end part 34a against the pilot hydraulic pressure. In the embodiment, the first energizing unit 36 is a compression spring.

In the switching valve 30, the spool 34 moves in the axial direction DA inside the sleeve 32 to switch the switching line for the hydraulic fluid. In a case in which the spool 34 is moved to the end part 34b side by the pilot hydraulic pressure against the energizing force of the first energizing unit 36, the first port 32a on the supply side communicates with the first port 32c on the driving part side, and the second port 32b on the supply side communicates with the second port 32d on the driving part side. That is, the first switching line is opened to cause the first supply line 90a to communicate with the third supply line 90c, and cause the second supply line 90b to communicate with the fourth supply line 90d. In a case in which the spool 34 is moved to the end part 34a side by the energizing force of the first energizing unit 36 against the pilot hydraulic pressure, the first port 32a on the supply side and the second port 32b on the supply side are closed, and the first port 32c on the driving part side communicates with the second port 32d on the driving part side. That is, the second switching line is opened to block between the first supply line 90a and the third supply line 90c, block between the second supply line 90b and the fourth supply line 90d, and cause the third supply line 90c to communicate with the fourth supply line 90d. In the embodiment, the restrictor element 30b is disposed in the flow channel 30a between the first port 32c on the driving part side and the second port 32d on the driving part side communicating with each other in the second switching line.

The sealing material 38 is disposed in the switching valve 30. The sealing material 38 seals the hydraulic fluid with the pilot hydraulic pressure. In the embodiment, the sealing material 38 is disposed between the sleeve 32 and the spool 34. The sealing material 38 seals the flow channel 30a inside the switching valve 30 against the pilot hydraulic line 94. That is, the sealing material 38 seals the switching line of the switching valve 30 against the pilot hydraulic line 94. The sealing material 38 is disposed so that both of the hydraulic fluid circulating in the flow channel 30a and the hydraulic fluid with the pilot hydraulic pressure do not leak out. The sealing material 38 is preferably disposed in the vicinity of the end part 34a side of the spool 34.

The spool 34 includes a fine hole 34c and a relief hole 34d. The fine hole 34c is formed along the axial direction AD of the spool 34 from a center on the end part 34a side toward the end part 34b side. The fine hole 34c communicates with the pilot hydraulic line 94 at the end part 34a. The relief hole 34d is formed along the axial direction AD of the spool 34 from the center on the end part 34b side toward the end part 34a side. The relief hole 34d communicates with the fine hole 34c. A diameter of the relief hole 34d is smaller than a diameter of the fine hole 34c. The relief hole 34d discharges the hydraulic fluid with the pilot hydraulic pressure circulating in the pilot hydraulic line 94 and the fine hole 34c to the outside of the spool 34. In the embodiment, the relief hole 34d discharges the hydraulic fluid to the auxiliary supply line 92 via the internal space 36a of the switching valve 30.

The third relief valve 40 is disposed in the pilot hydraulic line 94 on the downstream side of the two check valves 50 in the circulating direction. In a case in which the pilot hydraulic pressure of the pilot hydraulic line 94 exceeds a predetermined value, the third relief valve 40 discharges the hydraulic fluid from the pilot hydraulic line 94 to release the pilot hydraulic pressure.

In the embodiment, the third relief valve 40 is disposed on an inner side of the first energizing unit 36. The third relief valve 40 includes a valve body 42 and a second energizing unit 44. The valve body 42 is disposed on the end part 34b side of the spool 34. The valve body 42 closes the relief hole 34d. The valve body 42 metal-touches the relief hole 34d of the spool 34. The second energizing unit 44 is disposed on an opposite side of the end part 34b side of the spool 34 with respect to the valve body 42. The second energizing unit 44 energizes the valve body 42 to the relief hole 34d of the spool 34. In the embodiment, the second energizing unit 44 is a compression spring. In the embodiment, moving directions of the valve body 42 and the second energizing unit 44 are the same direction as the axial direction AD.

Next, the following describes an operation of the switching valve 30. In a case in which the pilot hydraulic pressure in the relief hole 34d is equal to or lower than a predetermined value, the valve body 42 closes the relief hole 34d against the pilot hydraulic pressure. In a case in which the pilot hydraulic pressure in the relief hole 34d exceeds the predetermined value, the valve body 42 opens the relief hole 34d against the energizing force of the second energizing unit 44. When the valve body 42 opens the relief hole 34d, the hydraulic fluid with the pilot hydraulic pressure circulating in the pilot hydraulic line 94, the fine hole 34c, and the relief hole 34d is discharged to the auxiliary supply line 92 via the internal space 36a of the switching valve 30.

Next, the following describes an operation of the electro-hydrostatic circuit 1. The electro-hydrostatic circuit 1 can switch the operation mode of the driving part 20 by changing a supply state of the hydraulic fluid at the solenoid valve 60. The supply state of the hydraulic fluid at the solenoid valve 60 can be changed by moving the valve body 62 to the supply position 62a or the discharge position 62b.

In a case in which the valve body 62 of the solenoid valve 60 is positioned at the supply position 62a, the hydraulic fluid is introduced into the pilot hydraulic line 94 from the first supply line 90a, and supplied to the switching valve 30 side via the check valve 50, and the supply port 60a and the port 60c on the switching valve side of the solenoid valve 60. Due to this, the pilot hydraulic pressure of the hydraulic fluid inside the pilot hydraulic line 94 is increased. When the pilot hydraulic pressure of the hydraulic fluid inside the pilot hydraulic line 94 is increased, the hydraulic fluid energizes the spool 34 of the switching valve 30 toward the end part 34b side. When the pilot hydraulic pressure of the hydraulic fluid moves the spool 34 toward the end part 34b side against the energizing force of the first energizing unit 36, the first switching line of the switching valve 30 is opened. The first switching line causes the first supply line 90a to communicate with the third supply line 90c, and causes the second supply line 90b to communicate with the fourth supply line 90d. Thus, the hydraulic fluid supplied from the hydraulic supply device 10 to the supply line 90 is supplied to the driving part 20 via the switching valve 30. Due to this, the driving part 20 is driven in the normal mode.

In a case in which the valve body 62 of the solenoid valve 60 is positioned at the discharge position 62b, the hydraulic fluid circulating between the solenoid valve 60 and the switching valve 30 in the pilot hydraulic line 94 is discharged to the discharge line 98 from the pilot hydraulic line 94 via the port 60c on the switching valve side and the discharge port 60b. Due to this, the pilot hydraulic pressure of the hydraulic fluid inside the pilot hydraulic line 94 is reduced. When the pilot hydraulic pressure of the hydraulic fluid inside the pilot hydraulic line 94 is reduced, the energizing force of the hydraulic fluid energizing the spool 34 of the switching valve 30 toward the end part 34b side is reduced. When the first energizing unit 36 moves the spool 34 to the end part 34a side against the energizing force of the pilot hydraulic pressure of the hydraulic fluid, the second switching line of the switching valve 30 is opened. The second switching line blocks between the first supply line 90a and the third supply line 90c, and blocks between the second supply line 90b and the fourth supply line 90d. The second switching line also causes the third supply line 90c to communicate with the fourth supply line 90d via the restrictor element 30b. Due to this, the driving part 20 is caused to be in the damping mode.

As described above, with the switching valve 30 according to the embodiment, overpressurization of the pilot hydraulic pressure can be suppressed by the relief hole 34d and the valve body 42. Additionally, in the switching valve 30, the relief hole 34d for discharging the pilot hydraulic pressure, the valve body 42, and the second energizing unit 44 are disposed on the spool 34, so that the weight can be reduced as compared with a configuration of adding a line that branches off from the pilot hydraulic line 94 and includes a relief valve disposed therein.

In the switching valve 30 according to the embodiment, moving directions of the valve body 42 and the second energizing unit 44 are the same as the axial direction AD, so that the energizing force of the second energizing unit 44 can efficiently act against the pilot hydraulic pressure. Due to this, the switching valve 30 can reduce the energizing force of the second energizing unit 44.

In the switching valve 30 according to the embodiment, the second energizing unit 44 is a compression spring, so that the configurations of the valve body 42 and the second energizing unit 44 can be further simplified.

In the switching valve 30 according to the embodiment, the valve body 42 metal-touches the relief hole 34d of the spool 34, so that the relief hole 34d can be more preferably closed by the valve body 42. Due to this, the switching valve 30 can prevent the hydraulic fluid from leaking out in a case in which the pilot hydraulic pressure is equal to or smaller than the predetermined value.

Additionally, the switching valve 30 according to the embodiment includes the sealing material 38 that is disposed between the sleeve 32 and the spool 34 to seal the switching line (flow channel 30a) against the pilot hydraulic line 94 for supplying the hydraulic fluid with the pilot hydraulic pressure. Due to this, the switching valve 30 can more preferably seal the sleeve 32 and the spool 34. Accordingly, the switching valve 30 can prevent the pilot hydraulic pressure from leaking out.

The electro-hydrostatic circuit 1 according to the embodiment includes: the supply line 90 configured to connect between the hydraulic supply device 10 that supplies hydraulic fluid and the driving part 20 configured to be driven by a hydraulic pressure of the hydraulic fluid supplied from the hydraulic supply device 10; the switching valve 30 that is disposed in the supply line 90, and configured to switch between a plurality of switching lines for the hydraulic fluid supplied to the driving part 20 by the pilot hydraulic pressure; the pilot hydraulic line 94 that is connected to the switching valve 30, and configured to supply the hydraulic fluid with the pilot hydraulic pressure; the check valve 50 disposed in the pilot hydraulic line 94; the solenoid valve 60 that is disposed in the pilot hydraulic line 94 on the downstream side of the check valve 50 in a circulating direction of the hydraulic fluid, and configured to change a supply state of the hydraulic fluid to the switching valve 30; and the sealing material 38 that is disposed in the switching valve 30 to seal the hydraulic fluid with the pilot hydraulic pressure. The electro-hydrostatic circuit 1 can also prevent the switching line from being unexpectedly switched due to pressure drop in the supply line 90 by preventing the pilot hydraulic pressure from leaking out with the check valve 50 and the sealing material 38. Furthermore, the electro-hydrostatic circuit 1 can prevent the electro-hydrostatic circuit 1 from being damaged by suppressing overpressurization of the pilot hydraulic pressure with the relief hole 34*d* and the valve body 42. Additionally, in the electro-hydrostatic circuit 1, the relief hole 34*d* for discharging the pilot hydraulic pressure, the valve body 42, and the second energizing unit 44 are disposed on the spool 34, so that the weight can be reduced as compared with a configuration of adding a line that branches off from the pilot hydraulic line 94 and includes a relief valve disposed therein. The electro-hydrostatic circuit 1 uses the pilot hydraulic pressure for switching the switching valve 30, and controls supply of the pilot hydraulic pressure with the solenoid valve 60, so that the solenoid valve 60 can be downsized as compared with a case of directly using the solenoid valve for switching the switching valve 30. Thus, with the electro-hydrostatic circuit 1, the weight of the entire electro-hydrostatic circuit 1 can be reduced, and power consumption can be suppressed.

In the aircraft including the control surface and the actuator serving as the driving part 20 for actuating the control surface by using the electro-hydrostatic circuit 1 according to the embodiment, the pilot hydraulic pressure is prevented from leaking out by the check valve 50 and the sealing material 38 of the electro-hydrostatic circuit 1. Due to this, in the aircraft, it is possible to prevent the switching line from being unexpectedly switched due to pressure drop in the supply line 90 of the electro-hydrostatic circuit 1. Additionally, in the aircraft, the electro-hydrostatic circuit 1 can be prevented from being damaged by suppressing overpressurization of the pilot hydraulic pressure with the relief hole 34*d* and the valve body 42 of the electro-hydrostatic circuit 1. Furthermore, in the aircraft, the relief hole 34*d* for discharging the pilot hydraulic pressure of the electro-hydrostatic circuit 1, the valve body 42, and the second energizing unit 44 are disposed on the spool 34, so that the weight can be reduced as compared with a configuration of adding a line that branches off from the pilot hydraulic line 94 and includes a relief valve disposed therein. In the aircraft, the pilot hydraulic pressure is used for switching the switching valve 30 of the electro-hydrostatic circuit 1, and supply of the pilot hydraulic pressure is controlled by the solenoid valve 60, so that the solenoid valve 60 can be downsized as compared with a case of directly using the solenoid valve for switching the switching valve 30. Thus, in the aircraft, the weight of the entire electro-hydrostatic circuit 1 can be reduced, and power consumption can be suppressed.

REFERENCE SIGNS LIST

1 ELECTRO-HYDROSTATIC CIRCUIT
10 HYDRAULIC SUPPLY DEVICE
20 DRIVING PART
30 SWITCHING VALVE
30*a* FLOW CHANNEL
30*b* RESTRICTOR ELEMENT
32 SLEEVE
32*a* FIRST PORT ON SUPPLY SIDE
32*b* SECOND PORT ON SUPPLY SIDE
32*c* FIRST PORT ON DRIVING PART SIDE
32*d* SECOND PORT ON DRIVING PART SIDE
34 SPOOL
34*a*, 34*b* END PART
34*c* FINE HOLE
34*d* RELIEF HOLE
36 FIRST ENERGIZING UNIT
36*a* INTERNAL SPACE
38 SEALING MATERIAL
40 THIRD RELIEF VALVE
42 VALVE BODY
44 SECOND ENERGIZING UNIT
50 CHECK VALVE
60 SOLENOID VALVE
60*a* SUPPLY PORT
60*b* DISCHARGE PORT
60*c* PORT ON SWITCHING VALVE SIDE
62 VALVE BODY
62*a* SUPPLY POSITION
62*b* DISCHARGE POSITION
64 ENERGIZING UNIT
66 ELECTROMAGNETIC DRIVING PART
70 FIRST RELIEF VALVE
72 SECOND RELIEF VALVE
90 SUPPLY LINE
90*a* FIRST SUPPLY LINE
90*b* SECOND SUPPLY LINE
90*c* THIRD SUPPLY LINE
90*d* FOURTH SUPPLY LINE
92 AUXILIARY SUPPLY LINE
94 PILOT HYDRAULIC LINE
94*a* MERGING PART
96*a* FIRST RELIEF LINE
96*b* SECOND RELIEF LINE
98 DISCHARGE LINE
AD AXIAL DIRECTION

The invention claimed is:
1. A switching valve comprising:
a sleeve having a plurality of ports;
a spool inside the sleeve and configured to move in an axial direction by a pilot hydraulic pressure to switch between switching lines, each switching line serving as a flow channel for hydraulic fluid and formed by a combination of the ports;
a first energizing unit configured to energize the spool against the pilot hydraulic pressure;
a relief hole on the spool to discharge the hydraulic fluid with the pilot hydraulic pressure;
a valve body configured to close the relief hole; and
a second energizing unit configured to energize the valve body toward the relief hole of the spool against the pilot hydraulic pressure to close the relief valve, and to allow the relief valve to open when the pilot hydraulic pressure exceeds a predetermined value.

2. The switching valve according to claim 1, wherein moving directions of the valve body and the second energizing unit are the same as the axial direction.

3. The switching valve according to claim 1, wherein the second energizing unit is a compression spring.

4. The switching valve according to claim 1, wherein the valve body metal-touches the relief hole of the spool.

5. The switching valve according to claim 1, further comprising a sealing material between the sleeve and the spool to seal the switching line against a pilot hydraulic line for supplying the hydraulic fluid with the pilot hydraulic pressure.

6. The switching valve according to claim 1, wherein each of the first energizing unit and the second energizing unit comprises a spring, the spring of the second energizing unit being located within and coaxial with the spring of the second energizing unit.

7. An electro-hydrostatic circuit comprising:
a supply line connecting between a hydraulic supply device configured to supply hydraulic fluid and a driving part to be driven by a hydraulic pressure of the hydraulic fluid supplied from the hydraulic supply device;
the switching valve according to claim 1 in the supply line to switch between the plurality of switching lines for the hydraulic fluid supplied to the driving part by the pilot hydraulic pressure;
a pilot hydraulic line connected to the switching valve to supply the hydraulic fluid with the pilot hydraulic pressure;
a check valve in the pilot hydraulic line;
a solenoid valve in the pilot hydraulic line on a downstream side of the check valve in a circulating direction of the hydraulic fluid, the solenoid valve being configured to change a supply state of the hydraulic fluid to the switching valve; and
a sealing material in the switching valve to seal the hydraulic fluid with the pilot hydraulic pressure.

8. An aircraft comprising:
a control surface; and
an actuator serving as the driving part to actuate the control surface by using the electro-hydrostatic circuit according to claim 7.

* * * * *